(12) United States Patent
Rimatzki et al.

(10) Patent No.: US 10,005,177 B2
(45) Date of Patent: Jun. 26, 2018

(54) ADJUSTABLE GRIP SIZE FOR CURVED OR STRAIGHT GRIP

(71) Applicant: GM Global Technology Operations LLC, Detroit, MI (US)

(72) Inventors: Hunter G. Rimatzki, Livonia, MI (US); Shreyas Kousik, Ann Arbor, MI (US); Jonathan A. Kurzer, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/173,768

(22) Filed: Jun. 6, 2016

(65) Prior Publication Data

US 2017/0348846 A1 Dec. 7, 2017

(51) Int. Cl.
*B62D 1/04* (2006.01)
*B25G 1/10* (2006.01)
*B62D 1/06* (2006.01)

(52) U.S. Cl.
CPC .............. *B25G 1/102* (2013.01); *B62D 1/06* (2013.01)

(58) Field of Classification Search
CPC .................................. B25G 1/102; B62D 1/06
See application file for complete search history.

(56) References Cited

U.S. PATENT DOCUMENTS

| | | | | |
|---|---|---|---|---|
| 2,576,751 | A * | 11/1951 | Dortmund | B25D 1/00 473/551 |
| 6,146,038 | A * | 11/2000 | Mittersinker | B43K 23/004 15/443 |
| 6,158,910 | A * | 12/2000 | Jolly | B25G 1/102 16/430 |
| 6,341,911 | B1 * | 1/2002 | Shueh | B43K 24/023 16/430 |
| 6,382,661 | B1 * | 5/2002 | Sutherland | B60R 21/2032 280/728.2 |
| 8,757,658 | B2 * | 6/2014 | Feinstein | B60R 21/203 280/731 |
| 2005/0268744 | A1 * | 12/2005 | Embach | B62D 1/06 74/551.9 |
| 2006/0100697 | A1 * | 5/2006 | Casanova | A61F 2/2448 623/2.11 |

* cited by examiner

*Primary Examiner* — Vicky A Johnson
(74) *Attorney, Agent, or Firm* — Lorenz & Kopf, LLP

(57) ABSTRACT

A product that may involve a product that may include a structure that may be formed to be gripped. A sheath may surround a core. An actuator may be connected to move the core to adjust the sheath between an expanded position and a contracted position, providing adjustable grip size to the structure.

17 Claims, 2 Drawing Sheets

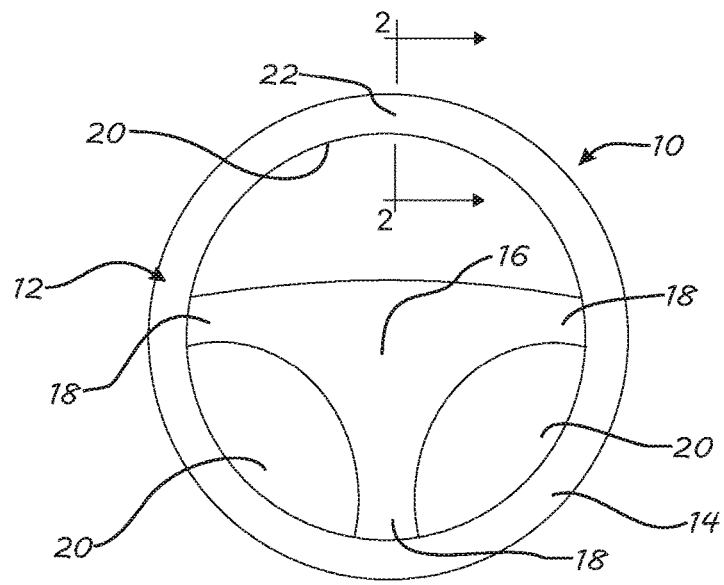
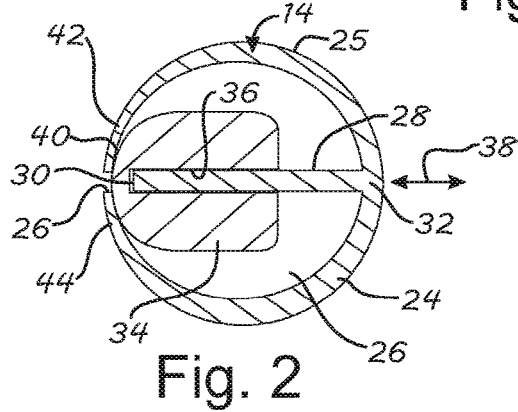
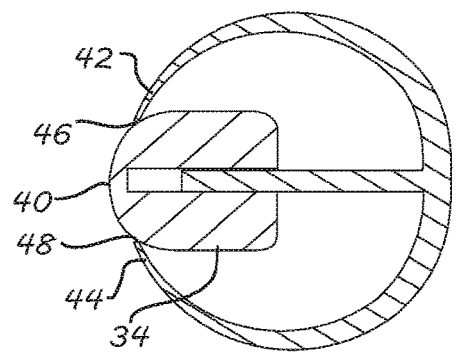
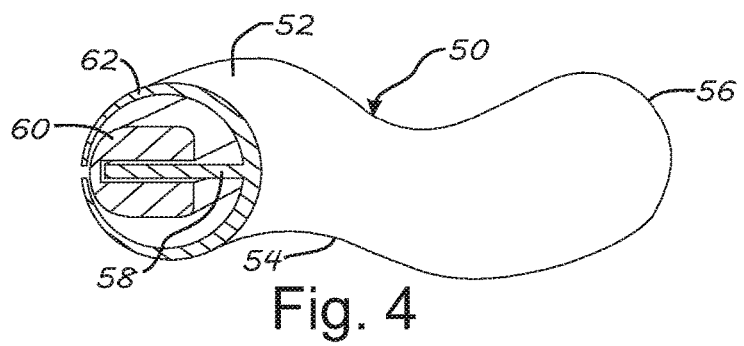

ADJUSTABLE GRIP SIZE FOR CURVED OR STRAIGHT GRIP

TECHNICAL FIELD

The field to which the disclosure generally relates includes grip structures and more particularly includes adjustable grip structures.

BACKGROUND

Grip structures may be used with objects and devices intended to be manually manipulated. The grip structure is typically provided in a fixed state for use by individuals regardless of their personal preferences or circumstances.

SUMMARY OF ILLUSTRATIVE VARIATIONS

A number of illustrative variations may involve a product that may include a structure that may be formed to be gripped. A sheath may surround a core. An actuator may be connected to move the core to adjust the sheath between an expanded position and a contracted position, providing adjustable grip size to the structure.

A number of additional illustrative variations may involve a product and may include a core defining a slot. A sheath may include a wall surrounding the core. The wall may define a gap. A guide may extend from the sheath inside the wall and toward the gap. The guide may extend into the slot a variable amount. An actuator may vary the variable amount to expand and contract the wall to provide a variable grip size to the sheath.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a product according to a number of variations.

FIG. 2 illustrates a schematic sectional view of the product of FIG. 1 taken along the line indicated as 2-2, and in a retracted condition, according to a number of variations.

FIG. 3 illustrates a schematic sectional view of the product of FIG. 1 and in an expanded condition according to a number of variations.

FIG. 4 illustrates a product according to a number of variations.

DETAILED DESCRIPTION OF ILLUSTRATIVE VARIATIONS

Figure 5:
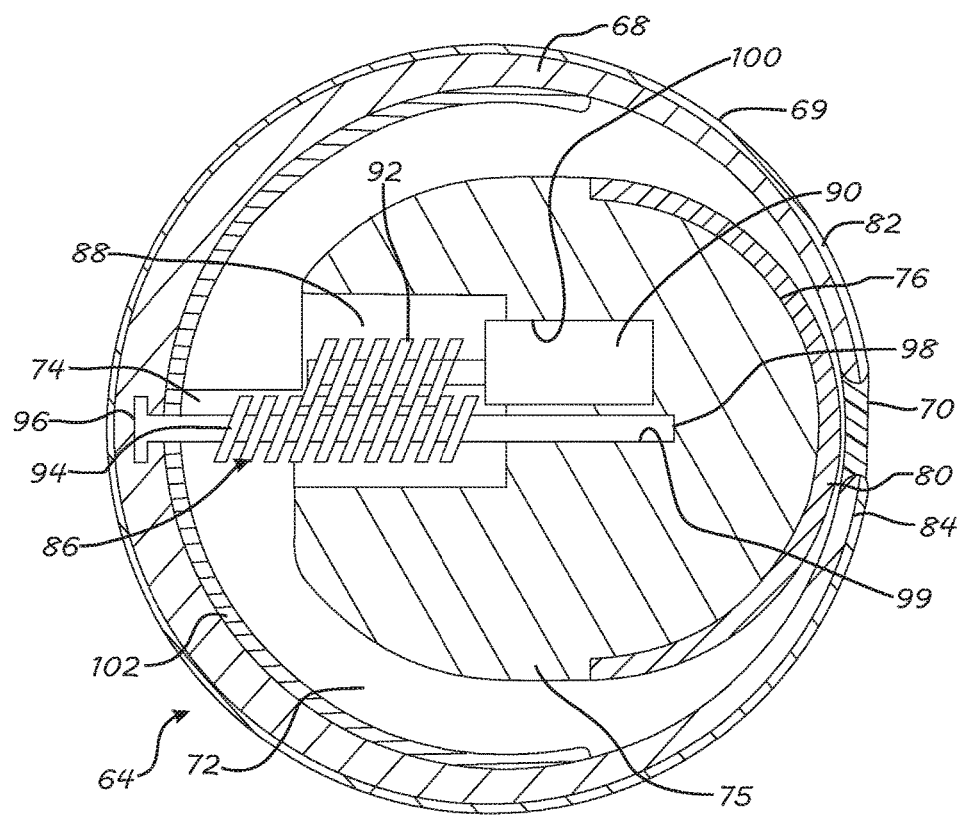
FIG. 5 illustrates a schematic sectional view of the product of FIG. 1 or 4 according to a number of variations.

The following description of the variations is merely illustrative in nature and is in no way intended to limit the scope of the invention, its application, or uses.

FIG. 1 illustrates a number of variations wherein a product 10 may include a structure 12 that may be gripped by hand for manipulation of the product 10. The structure 12 may be straight, curved, angled, or some combination thereof. The structure 12 may have a cross section that may be grasped within a completely, or partially, closed hand. The structure 12 by way of example may be part of a steering wheel as the product 12. In other variations the product may be any structure intended to be gripped. The structure 12 may be curved into a closed loop, or may have ends. The structure 12 may form an outer ring 14 that may be connected with a center hub 16 by a number of spokes 18. The spokes 18 may be any number extending between the center hub 16 and the outer ring 14, and may generally be spaced apart at the outer ring 14 to create handhold spaces 20. In a number of variations the outer ring 14 may have a variable sized cross section, which may be limited to the sections of the outer ring 14 at the handhold spaces, or may include the entire rim 14, or any part or parts thereof. For example, the outer ring 14 may include a variable section 22 at a convenient location for gripping.

In a number of variations the variable section 22 is shown in cross section in FIG. 2. The outer ring 14 may include an outer sheath 24 that may be substantially closed with a circumferential wall 25 and may include a gap 26. At its interior, the sheath 24 may form a void 26 or voids. A guide 28 may extend from the sheath 24 into the void 26. The guide 28 may take the form of a cantilevered structure, with a terminal edge 30, and may extend along at least a portion of the length or circumference of the outer ring 14. The guide 28 may extend from the sheath 24 at a point 32 opposite the gap 26, and may extend toward the gap 26, but may not extend completely to the gap 26. A core 34 may be positioned in the interior of the outer ring 14. The core 34 may define a slot 36 that may extend into the core 34. The core 34 may be received over the guide 28, which may extend into the slot 36. In a number of variations the core 34 may be rigid or substantially rigid so that it may carry and transmit a load. The mating features of the guide 28 and the core 34 provide a way to constrain motion of the core 34 to a direction 38 where the guide 28 may slide into or out of the slot 36. The guide 28 may include a face 40 that may be smooth and may be curved. The face 40 may engage the sheath 24 adjacent the gap 26. The sheath 24 may include flexible sections 42, 44 adjacent the gap 26, at least part of which engage, or may be engageable with, the face 40. In FIG. 2, the sheath 24 may be shown in a retracted condition where the guide 28 is extended into the slot 36 at or near its maximum extent.

In a number of variations as illustrated in FIG. 3, the sheath 24 may be moved to an expanded condition where the core 34 is moved to retract the guide 28, at least partially out of the slot 36. The guide 28 may be moved under an applied force to move against the flexible sections 42, 44 forcing their ends 46, 48 apart. As a result, the cross sectional area of the sheath 24 may expand and may be larger as the ends 48, 48 slide on the face 40. The sheath 24 may be presented in a variety of grip sizes, reversibly expanded and contracted by the core 34, including the retracted size of FIG. 2 and the expanded size of FIG. 3. When the applied force on the core 34 may be reduced, the core may retract and the gap 26 may be reduced. The flexible sections 42, 44 may contract, closing the gap 26 and reducing the grip size of the sheath 24.

In a number of variations as illustrated on FIG. 4, a grip structure 50 may take a variety of shapes that may include straight segments 52, curved segments 54, other shapes, or combinations of any of the foregoing. The grip structure may be a handle that may have a terminal end 56, or may be a part of a continuing structure. The guide 58 may extend along part of the length of the structure 50, or along its entire length. The core 60 may extend along the guide 58 in the interior of the sheath 62, along its entire length or only a part or parts thereof.

In a number of variations as illustrated in FIG. 5, a structure 64 that may have an adjustable grip size may include a sheath 68. The sheath 68 may be covered by an outer cover 69 or other material for a desired appearance or feel. The sheath 68 may be closed with an elastic section 70 that may be resiliently expandable and contractible. The elastic section 70 may be formed of a rubber or polymer material, fabric, or other material. The elastic section 70 may be bonded, or connected to, the sheath 68, or to the outer cover 69, or both, for reversible sizing. The elastic section 70 may be constructed to elastically deform over the range of expansion and contraction of the sheath 68. Including the elastic section 70 may provide a more consistent surface to the sheath 68 around its perimeter. The sheath 68 may be covered by an outer grip material The sheath 68 may define a void 72 in its interior. The guide 74 may extend from the sheath 68 in its interior toward the elastic section 70. The core 75 may be positioned in the interior of the sheath 68, and may be guided by the guide 74 during expansion and contraction. The core 75 may be made of a rigid material such as metal, or another material suitable for the needed rigidity of the application. The core 75 may include a face 76 that may face the elastic section 70 and the adjacent sections of the sheath 68. The face 76 may be curved and may be covered with a mating veneer 80, which may engage, or may be engageable with the elastic section 70 and the adjacent sections 82, 84 of the sheath 68. The veneer 80 may be made of a material with a lower friction than the structural core 75, to assist in sliding movement of the sections 82, 84 as the sheath is expanded and contracted.

In a number of variations, the guide 74 may have a gap or gaps that may accommodate the placement of an actuator 86 or multiple actuators to provide the desired actuation. The actuator 86 may provide the motive force to move the core 75 so that the guide 74 moves in or out of the slot 88 as the core 75 moves relative to the guide 74. The slot 88 in the core 75 may be enlarged at locations needed to accommodate the actuator 86. The actuator may be driven by a power source 90, such as an electric motor. The power source 90 may rotate a gear 92, which may be a worm gear. A mating member 94 may engage, or may mesh with, the gear 92 may be fixed to the sheath 68 at an end 96. An opposite end 98 of the mating member 94 may be slidably engaged in the core 75, such as in a bore 99. The mating member 94 may be a gear or a rack that mates with the gear 92. The power source 90 may be fixed to the core 75, such as in a bore 100. It will be appreciated that the components may be reversed so that the power source may be connected to the sheath 68 and the mating member may be connected to the core 75. The power source 90 may rotate the gear 92 in either direction so that the gear 92 translates along the mating member 94 to move the core 75 to expand or contract the sheath 68 and the outer cover 69. A spring element 102, such as a c-shaped torsion spring may be positioned adjacent the inside of the sheath 68. The spring element 102 may apply a tension to hold the sections 82, 84 against the face 76 at the veneer 80.

Figure 6:
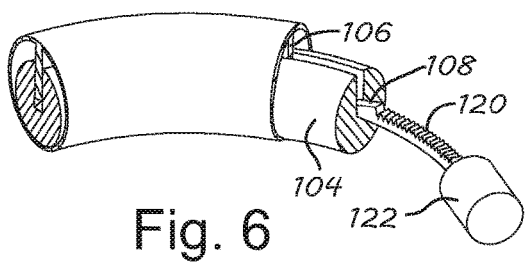
FIG. 6 illustrates an actuator detail of a product, in schematic view, according to a number of variations.
Figure 7:
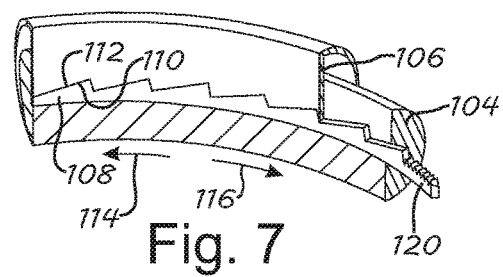
FIG. 7 illustrates an actuator detail of the product of FIG. 6, in sectioned, schematic view, according to a number of variations.

In a number of variations as illustrated in FIGS. 6 and 7, the core 104 may be actuated to move relative to the guide 106 by a rack 108. The guide 106 may include at least one ramp 110. The rack 108 may include at least one mating ramp 112. Translation of the rack 108 in a first direction 114 may move a higher portion of the ramp 112 to register with a shallow portion of the ramp 110 forcing the core 104 away from the guide 106. As a result the sheath 115 may be expanded. Translation of the rack 108 in a second direction 116 may move a lower portion of the ramp 112 to register with a deeper portion of the ramp 110 allowing the core 104 to move toward the guide 106. As a result, the sheath 115 may be contracted. The rack may include a toothed section 120 that may mesh with a gear 122. The gear 122 may be rotated by a power source to provide the motive force to translate the rack 108 in the direction 114, 116. The power source may be electric, hydraulic, pneumatic, manual, or a combination thereof.

Through the variations described herein, an adjustable grip size may be selectively provided for personal customization. Personalization of the grip size may increase user comfort. A larger grip size may be selected for individual users, and a smaller grip size may be selected for other users. The grip size may be adjusted in fine increments across a wide range, which may be customized on an individual basis. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a structure that may be formed to be gripped. A sheath may surround a core. An actuator may be connected to move the core to adjust the sheath between an expanded position and a contracted position, providing adjustable grip size to the structure.

Variation 2 may include the product according to variation 1 and may include a guide that may extend from the sheath and the core may form a slot into which the guide extends.

Variation 3 may include the product according to variation 2 wherein the actuator may be engaged between the core and the guide to move the core so that the guide moves into and out of the slot.

Variation 4 may include the product according to variation 1 wherein the sheath may include a circumferential wall that defines an interior void. The core may be positioned in the void. The circumferential wall may include a gap. A pair of wall sections may be positioned adjacent each side of the gap. The wall sections may be flexible. The core may include a face that may engage the wall sections.

Variation 5 may include the product according to variation 4 and may include an elastic section closing the gap.

Variation 6 may include the product according to variation 4 and may include an outer cover covering the sheath on an opposite side of the circumferential wall from the void.

Variation 7 may include the product according to variation 4 and may include a spring element that may be positioned in the void against the wall to apply a tension to move the pair of wall sections toward the core.

Variation 8 may include the product according to variation 1 wherein the structure may include a curved section.

Variation 9 may include the product according to variation 8 wherein the structure comprises a steering wheel and the core extends in the curved section.

Variation 10 may include the product according to variation 1 and may include a motor driving the actuator in reversible directions.

Variation 11 may involve a product and may include a core defining a slot. A sheath may include a wall surrounding the core. The wall may define a gap. A guide may extend from the sheath inside the wall and toward the gap. The guide may extend into the slot a variable amount. An actuator may vary the variable amount to expand and contract the wall to provide a variable grip size to the sheath.

Variation 12 may include the product according to variation 11 wherein the core may include a face facing the gap. A veneer may cover the face. The veneer may have a low friction surface.

Variation 13 may include the product according to variation 11 wherein the actuator may be engaged between the core and the guide to vary the variable amount.

Variation 14 may include the product according to variation 11 wherein the wall may define an interior void. The core may be positioned in the void. The sheath may include a pair of wall sections adjacent each side of the gap. The wall sections may be flexible.

Variation 15 may include the product according to variation 14 and may include an elastic section closing the gap.

Variation 16 may include the product according to variation 14 and may include an outer cover covering the sheath on an opposite side of the wall from the void.

Variation 17 may include the product according to variation 14 and may include a spring element that may be positioned in the void against the wall to apply a tension to move the pair of wall sections toward the core.

Variation 18 may include the product according to variation 11 wherein the guide may include a ramp and the actuator may include a rack engaging the ramp.

Variation 19 may include the product according to variation 11 and may include a motor driving the actuator in reversible directions.

Variation 20 may include the product according to variation 19 and may include a gear driven by the motor. A mating member may mesh with the gear. The motor and the mating member may be connected between the core and the guide.

The above description of select variations within the scope of the invention is merely illustrative in nature and, thus, variations or variants thereof are not to be regarded as a departure from the spirit and scope of the invention.

What is claimed is:

1. A product comprising a structure formed to be gripped, that has a core, a sheath that includes a circumferential wall surrounding the core, and an actuator connected to move the core to adjust the sheath between an expanded position and a contracted position, providing adjustable grip size to the structure, wherein the circumferential wall includes a pair of wall sections defining a gap in the circumferential wall, with one of the wall sections disposed adjacent each side of the gap, wherein the core includes a face that engages each of the wall sections and faces the gap, wherein the actuator is configured so that in the contracted position the core is moved by the actuator and the gap is reduced in size relative to the expanded position, wherein the structure comprises a curved section of a steering wheel, and the core extends in the curved section.

2. The product according to claim 1 comprising a guide extending from the sheath to a terminal edge and the core forming a slot into which the guide extends with the terminal edge disposed in the slot, wherein the guide slides into the slot for the contracted position and slides out of the slot for the expanded position.

3. The product according to claim 2 wherein the actuator is disposed between the core and the sheath, and moves the core relative to the sheath so that the guide moves into and out of the slot.

4. The product according to claim 2 wherein the circumferential wall defines an interior void, the core positioned in the interior void, wherein the guide extends toward the gap from a point on the circumferential wall opposite the gap to the terminal edge.

5. The product according to claim 4 comprising an elastic section extending between the wall sections and closing the gap wherein the elastic section is resiliently expandable and contractible.

6. The product according to claim 4 comprising an outer cover covering the sheath on an opposite side of the circumferential wall from the interior void.

7. The product according to claim 4 comprising a spring element positioned in the interior void against the circumferential wall to apply a tension to move the wall sections toward the core.

8. The product according to claim 1 comprising a rack disposed between the core and the guide, with at least one ramp formed on the guide and at least one mating ramp formed on the rack, the rack including a toothed section, and a motor driving the rack at the toothed section in reversible directions to alternately expand or contract the sheath by sliding the mating ramp along the ramp.

9. A product comprising a core defining a slot, a sheath with a wall surrounding the core, the wall defining a gap, a guide in the form of a cantilevered structure extending from a point on the sheath opposite the gap and inside the wall toward the gap and into the slot a variable amount, and an actuator varying the variable amount to expand and contract the wall to provide a variable grip size to the sheath, wherein the actuator is disposed between the core and the sheath, and the actuator is configured to move the core relative to the sheath so that the guide moves into and out of the slot to vary the variable amount.

10. The product according to claim 9 wherein the core includes a face facing the gap and a veneer covers the face, the veneer having a low friction surface.

11. The product according to claim 9 wherein the guide includes a ramp and the actuator comprises a rack engaging the ramp, the rack disposed between the core and the guide and including a mating ramp formed on the rack, wherein translation of the rack causes the ramp and the mating ramp to expand or contract the sheath.

12. The product according to claim 9 comprising a motor driving the actuator in reversible directions.

13. The product according to claim 12 comprising a gear driven by the motor and comprising a mating member meshing with the gear, the motor and the mating member connected between the core and the guide.

14. A product comprising a core defining a slot, a sheath with a circumferential wall surrounding the core, the circumferential wall defining a gap, a guide in the form of a cantilevered structure extending from the sheath inside the circumferential wall and toward the gap, the guide extending into the slot a variable amount, an actuator varying the variable amount to expand and contract the circumferential wall to provide a variable grip size to the sheath, wherein the circumferential wall defines an interior void, the core positioned in the interior void, wherein the sheath includes a pair of wall sections with one of the walls sections adjacent each side of the gap, wherein the wall sections are flexible, the core guided by the guide during expansion and contraction of the circumferential wall, the core including a face that faces the interior void and the wall sections to vary the gap by moving the wall sections closer together or further apart as the variable amount is varied.

15. The product according to claim 14 comprising an elastic section closing the gap.

16. The product according to claim 14 comprising an outer cover covering the sheath on an opposite side of the circumferential wall from the interior void.

17. The product according to claim 14 comprising a spring element that is C-shaped and is positioned in the interior void adjacent the sheath and against the circumferential wall to apply a tension to move the pair of wall sections toward the core and to hold the pair of wall sections against the face.

* * * * *